US009739514B2

United States Patent
Seki et al.

(10) Patent No.: US 9,739,514 B2
(45) Date of Patent: Aug. 22, 2017

(54) CHILLER APPARATUS WITH FREEZING CYCLE FOR COOLING AND REFRIGERANT CYCLE FOR HEATING

(71) Applicant: SHINWA CONTROLS CO., LTD, Kawasaki-shi, Kanagawa (JP)

(72) Inventors: Atsushi Seki, Kawasaki (JP); Shigeo Aoki, Kawasaki (JP); Fumiyuki Hosoi, Kawasaki (JP)

(73) Assignee: SHINWA CONTROLS CO., LTD, Kawasaki-shi (JP)

( * ) Notice: Subject to any disclaimer, the term of this patent is extended or adjusted under 35 U.S.C. 154(b) by 0 days.

(21) Appl. No.: 14/888,823

(22) PCT Filed: Feb. 10, 2015

(86) PCT No.: PCT/JP2015/053663
§ 371 (c)(1),
(2) Date: Nov. 3, 2015

(87) PCT Pub. No.: WO2015/125669
PCT Pub. Date: Aug. 27, 2015

(65) Prior Publication Data
US 2016/0084553 A1    Mar. 24, 2016

(30) Foreign Application Priority Data
Feb. 24, 2014   (JP) ................. 2014-033013

(51) Int. Cl.
F25B 49/02   (2006.01)
F25B 1/00    (2006.01)
F25B 25/00   (2006.01)

(52) U.S. Cl.
CPC ............ F25B 49/02 (2013.01); F25B 1/00 (2013.01); F25B 49/022 (2013.01);
(Continued)

(58) Field of Classification Search
CPC .......... F25B 7/00; F25B 25/008; F25B 49/02; F25B 2600/021; F25B 25/00; F25B 2600/0215
See application file for complete search history.

(56) References Cited

U.S. PATENT DOCUMENTS 4,962,648 A * 10/1990 Takizawa ................ F25B 5/02
                                                                    62/199
6,003,595 A    12/1999 Watanabe
(Continued)

FOREIGN PATENT DOCUMENTS

CN    102305505 A    1/2012
CN    102734994 A    10/2012
(Continued)

OTHER PUBLICATIONS

Oct. 20, 2016 Office Action issued in Korean Patent Application No. 10-2015-7031218.
(Continued)

Primary Examiner — Jonathan Bradford
(74) Attorney, Agent, or Firm — Oliff PLC

(57) ABSTRACT

Chiller apparatus performs temperature-control operation without placing excessive load on an electric compressor even when temperature difference between set and work temperatures are small; little temperature difference between refrigerant intake side and refrigerant discharge side of an evaporator in freezing-cycle, at time of temperature-control setting with small temperature difference between set and work temperatures; PCB2 performs PID operation on refrigerant detection temperature by sensor near the side of refrigerant inflow of a heating apparatus in a refrigerant-cycle; a PCB1 performs serial communication of a drive control signal for an inverter generated based on a result, and controls the compressor rotational speed according to work temperature within range. PCB2 performs PID operation on (Continued)

the work temperature detected by a first sensor, and PCB1 controls opening and closing of an electronic expansion valve by driving a stepping-motor according to a pulse signal generated based on result, and controls flow rate of refrigerant.

7 Claims, 1 Drawing Sheet

(52) U.S. Cl.
CPC .......... *F25B 49/025* (2013.01); *F25B 25/005* (2013.01); *F25B 2600/021* (2013.01); *F25B 2700/1933* (2013.01); *F25B 2700/21151* (2013.01); *Y02B 30/741* (2013.01)

(56) References Cited

U.S. PATENT DOCUMENTS

| | | | | |
|---|---|---|---|---|
| 6,775,996 | B2* | 8/2004 | Cowans | ............... B23Q 11/141 |
| | | | | 62/160 |
| 2003/0079485 | A1 | 5/2003 | Nakata | |
| 2012/0297804 | A1* | 11/2012 | Yamashita | ............ F25B 25/005 |
| | | | | 62/207 |

FOREIGN PATENT DOCUMENTS

| | | |
|---|---|---|
| JP | H10-220947 A | 8/1998 |
| JP | 2001-165058 A | 6/2001 |
| JP | 3079839 U | 8/2001 |
| JP | 3234523 B2 | 12/2001 |
| JP | 2008-075919 A | 4/2008 |
| JP | 2008-075920 A | 4/2008 |
| JP | 3160443 U | 6/2010 |
| JP | 2010-145036 A | 7/2010 |
| JP | 2012-072939 A | 4/2012 |
| JP | 5239204 B2 | 7/2013 |
| JP | 2014-020688 A | 2/2014 |

OTHER PUBLICATIONS

May 19, 2015 Search Report issued in International Patent Application No. PCT/JP2015/053663.

Aug. 15, 2016 Office Action issued in Chinese Patent Application No. 201580000768.1.

Jan. 3, 2017 Office Action issued in Korean Patent Application No. 10-2015-7031218.

* cited by examiner

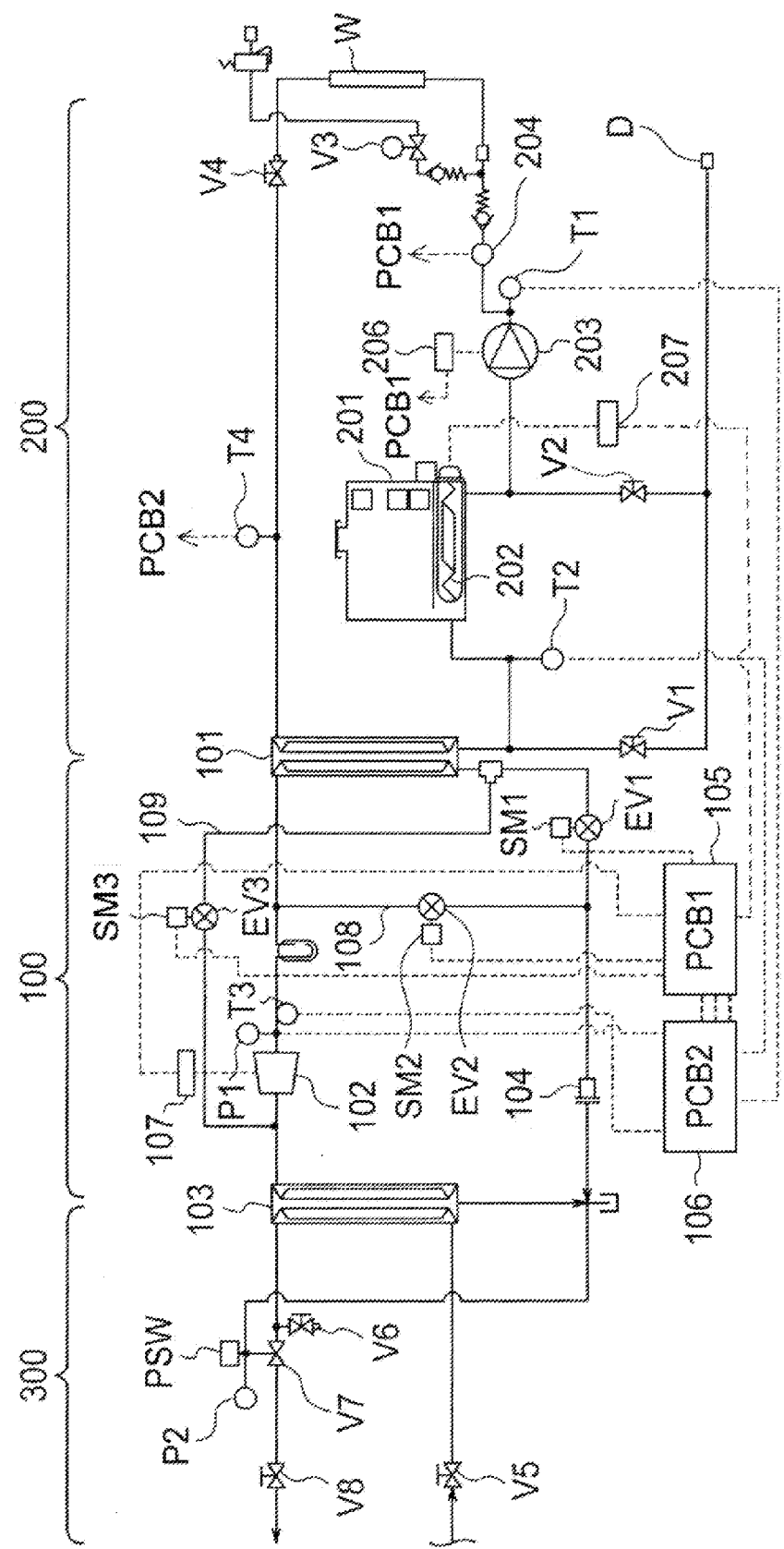

CHILLER APPARATUS WITH FREEZING CYCLE FOR COOLING AND REFRIGERANT CYCLE FOR HEATING

TECHNICAL FIELD

The present invention relates to a temperature-controlling chiller apparatus for a user (user) to selectively set a temperature within a predetermined temperature range (for example, −20° C. to 60° C.) while using various apparatuses to be temperature control targets as a work, and specifically, relates to a chiller apparatus with a function of controlling the rotational speed of an electric compressor provided to a freezing cycle for cooling and the heating temperature of a heating apparatus provided to a refrigerant cycle for heating according to a temperature difference between a set temperature and a work temperature by means of a control apparatus.

BACKGROUND ART

Conventionally, this type of chiller apparatuses have a circuit configuration in which a refrigerant is circulated through a freezing cycle for cooling and a refrigerant cycle for heating within a pipe, and a work to be a temperature control target load is interposed and connected at a limited part of the refrigerant cycle. The freezing cycle serves as a primary temperature adjusting circuit with a circuit configuration in which: a refrigerant gas is compressed by an electric compressor and sent to a condenser on the discharge side as a high-pressure gas; in the condenser, the high-pressure gas is condensed and sent to an evaporator after going through an expansion valve of a decompression mechanism and being decompressed; and in the evaporator, the decompressed low-pressure refrigerant in a gas-liquid mixed state is evaporated and sucked into the intake side of the electric compressor so that the compression is repeated again. The refrigerant cycle serves as a secondary temperature adjusting circuit with a circuit configuration that: shares the evaporator of the freezing cycle; collects and stores a refrigerant liquid in a low-pressure liquid state in a refrigerant tank; and heats the refrigerant liquid in a heating apparatus (heater) mounted in the refrigerant tank as appropriate, or does not heat it but returns the refrigerant liquid suctioned, by a pump, from the refrigerant tank to the evaporator by interposing the work.

The rotational speed of the compressor provided to the freezing cycle and the heating temperature of the heating apparatus provided to the refrigerant cycle here are controlled by the control apparatus according to a temperature difference between the set temperature and the work temperature, the control apparatus being provided for selective temperature setting within a predetermined temperature range (for example, −20° C. to 60° C.) for use by a user. Temperature sensors are provided to the freezing cycle and the refrigerant cycle, respectively, and a work temperature is detected by a temperature sensor provided to a part on the side of the pump of the refrigerant cycle that is closer to the work. The work temperature here may be usually often close to an ambient temperature (for example, around about 20° C. to 25° C.) which is about the room temperature, but is not necessarily so. Therefore, the relationship between the work temperature and the ambient temperature does not matter here.

In the control apparatus, control in different operation modes is performed according to a temperature difference between an initial set temperature and a work temperature. For example, at a time of high temperature setting with a temperature difference resulting from the set temperature being far higher than the work temperature (for example, the temperature difference is 10° C. or larger), an operation mode of prioritizing a heating function is implemented such that, because a cooling function of the freezing cycle is unnecessary, the rotational speed of the compressor is suppressed to be low, and the heating temperature of the heating apparatus of the refrigerant cycle is set to be high so as to remove the temperature difference. Also, at a time of low temperature setting with a temperature difference resulting from the set temperature being far lower than the work temperature (for example, the temperature difference is 10° C. or larger), an operation mode of prioritizing a cooling function is implemented such that, because a heating function by the heating apparatus of the refrigerant cycle is unnecessary, heating setting of the heating apparatus is not performed, and the rotational speed of the electric compressor of the freezing cycle is set to be high so as to remove the temperature difference. Furthermore, at a time of temperature control setting with a small temperature difference resulting from the set temperature being close to the work temperature (for example, 5° C. to 10° C.) (including a case where the above-mentioned operation mode of prioritizing the heating function, and operation mode of prioritizing the cooling function are continuously implemented, and the temperature difference became small, and a case where there is no temperature difference initially), both the heating function by the heating apparatus and the cooling function of the freezing cycle are implemented, and specifically, an operation mode of switching between the heating function and the cooling function is implemented such that the rotational speed of the compressor is slightly increased or decreased from a predetermined value or heating by the heating apparatus is slightly increased or decreased from a predetermined value so as to remove the temperature difference.

Note that well-known techniques related to a temperature control function of such a chiller apparatus include, for example, a "chiller apparatus" that can operate stably over a wide temperature range and accurately control the temperature of a coolant (see Patent Literature 1), a "chiller apparatus" that does not require a large heater and can accurately control the temperature of a coolant (see Patent Literature 2), and the like.

CITATION LIST

Patent Literature

Patent Literature 1: JP-A No. 2008-75919
Patent Literature 2: JP-A No. 2008-75920

SUMMARY OF INVENTION

Technical Problem

Because the above-mentioned existing chiller apparatuses have a structure in which a compressor continues operation even if it is not necessary to flow a refrigerant to an evaporator at a time of temperature control setting with a small temperature difference resulting from a set temperature being close to a work temperature, especially in a state where there is little difference between refrigerant temperatures on the refrigerant intake side and refrigerant discharge side of the evaporator in the freezing cycle, there is a problem that in such a case, there is a risk that an abnormal excessive load (pressure) is placed on the compressor, and may cause a malfunction of the compressor, and the cooling function in the freezing cycle becomes instable, and the temperature control operation cannot be maintained stably (this problem cannot be solved basically, even if the techniques disclosed in Patent Literature 1 and Patent Literature 2 are applied).

The present invention has been made to solve such a problem, and a technical object thereof is to provide a chiller apparatus with a function for stable temperature control operation without placing an excessive load on a compressor even at a time of a small temperature difference between a set temperature and a work temperature and little temperature difference between the refrigerant intake side and the refrigerant discharge side of an evaporator in the freezing cycle.

Solution to Problem

In order to solve the above-mentioned technical problem, the present invention provides a chiller apparatus comprising: a freezing cycle for cooling; a refrigerant cycle for heating that shares an evaporator provided to the freezing cycle; and a control apparatus that is interposed and connected within the refrigerant cycle, the control apparatus being provided for selective temperature setting within a predetermined temperature range for use by a user while using various apparatuses to be temperature control targets as a work, the control apparatus being configured to control a rotational speed of an electric compressor provided to the freezing cycle and a heating temperature in a heating apparatus for heating of a refrigerant provided to the refrigerant cycle according to a temperature difference between a set temperature set by the user and a work temperature detected by a first temperature sensor provided at a part on the side of the refrigerant cycle that is closer to the work, wherein the refrigerant cycle has a second temperature sensor that is provided on a near side of refrigerant inflow to the heating apparatus on the refrigerant discharge side of the evaporator, and detects a refrigerant temperature, and at a time of temperature control setting with a small temperature difference between the set temperature and the work temperature, the control apparatus performs serial communication of a drive control signal for an inverter for driving the electric compressor, the control signal being generated based on a result of a PID operation including proportion, integration and differential calculus about a refrigerant cycle side refrigerant detection temperature detected by the second temperature sensor, and the control apparatus controls the compressor rotational speed in the electric compressor according to the work temperature within a certain range.

Effect of Invention

According to the chiller apparatus of the present invention, because at a time of temperature control setting with a small temperature difference between the set temperature and the work temperature, the control apparatus performs serial communication of a drive control signal for an inverter for driving the electric compressor, the control signal being generated based on a result of a PID operation about a refrigerant cycle side refrigerant detection temperature detected by the second temperature sensor which: is provided on the near side of the refrigerant inflow to the heating apparatus on the refrigerant discharge side of the evaporator which plays a main role in a heat exchange function in the freezing cycle; and is for detecting a refrigerant temperature, and the control apparatus controls the compressor rotational speed in the electric compressor according to the work temperature within a certain range, a function for stable temperature control operation without placing an excessive load on the electric compressor even at a time of a small temperature difference between the set temperature and the work temperature and little temperature difference between the refrigerant intake side and the refrigerant discharge side of the evaporator in the freezing cycle can be attained.

BRIEF DESCRIPTION OF DRAWINGS

FIG. 1 is an overall schematic diagram illustrating the basic configuration of a chiller apparatus according to an embodiment of the present invention with a cooling apparatus that establishes connection with a work in a refrigerant cycle and performs cooling on a condenser in a freezing cycle.

DESCRIPTION OF EMBODIMENTS

Hereinafter, a chiller apparatus of the present invention is explained in detail by showing an embodiment and with reference to drawings.

Embodiment

FIG. 1 is an overall schematic diagram illustrating the basic configuration of a chiller apparatus according to an embodiment of the present invention with a cooling apparatus 300 that establishes connection with a work W in a refrigerant cycle 200 and performs cooling on a condenser 103 in a freezing cycle 100. The term "work" as used herein refers to various apparatuses to be temperature control targets, e.g., a temperature controlled device.

Referring to FIG. 1, this chiller apparatus is the same in that it has a function for temperature control in which a user (user) selectively sets a temperature within a predetermined temperature range (for example, −20° C. to 60° C.) while using various apparatuses to be temperature control targets as the work W as in the conventional techniques. Here, the freezing cycle 100 for cooling, the refrigerant cycle 200 for heating, and a control apparatus are provided. The refrigerant cycle 200 shares an evaporator (heat exchanger) 101 provided to the freezing cycle 100. The control apparatus is interposed and connected in the refrigerant cycle 200, and is provided for selective temperature setting within a predetermined temperature range for use by a user while using various apparatuses (load) to be temperature control targets as the work W. The control apparatus is formed with a first printed circuit board (PCB1) 105 and a second printed circuit board (PCB2) 106 provided with a CPU, a ROM, a RAM, an IO or the like for controlling the rotational speed of an electric compressor 102 provided to the freezing cycle 100 and the heating temperature in a heating apparatus (heater) 202 for heating of a refrigerant provided to the refrigerant cycle 200 according to a temperature difference between a set temperature set by a user at an operation unit which is for use by a user and is not shown in the FIGURE, and a work temperature detected by a first temperature sensor T1 provided at a part on the side of the refrigerant cycle 200 that is closer to the work W. The chiller apparatus has a function of circulating a refrigerant by the freezing cycle 100 and the refrigerant cycle 200 for temperature control on the work W.

Note that, although the first temperature sensor T1 for detecting the work temperature here is provided on the refrigerant discharge side of the pump 203 that suctions a refrigerant from a refrigerant tank 201 provided to the refrigerant cycle 200, and on the refrigerant inflow side closer to the work W, and detects the refrigerant cycle side refrigerant temperature to send it out to the second printed circuit board (PCB2), other than this, a refrigerant detection temperature from a fourth temperature sensor T4 provided to the refrigerant intake side of the evaporator 101 and the refrigerant outflow side closer to the work W may be input to the second printed circuit board (PCB2) 106, and both the detection results may be used together to detect the work temperature. Because the first temperature sensor T1 here is required to have high temperature detection accuracy, a Pt sensor that uses a platinum resistance band that can change the resistance value from 100 ohms to 0 ohm is preferably used. In contrast, because the fourth temperature sensor T4 is not required to have as high detection accuracy as the first temperature sensor T1, a thermocouple sensor that uses a general thermocouple is preferably used in consideration of manufacturing cost.

Among them, the freezing cycle 100 serves as a primary temperature adjusting circuit with a circuit configuration in which: a refrigerant gas is compressed by the electric compressor 102 and sent to the condenser 103 on the discharge side as a high-pressure gas; in the condenser 103, the high-pressure gas is condensed and sent to the evaporator 101 after going through the expansion valve 104 of a decompression mechanism and being decompressed; and in the evaporator 101, the decompressed low-pressure gas is evaporated and sucked into the intake side of the electric compressor 102 so that the compression is repeated again. Also, here, the cooling apparatus 300 that has a structure in which piping is connected to the condenser 103 so that the piping is folded, and cooling water is taken in via a valve V5 provided to a pipe on the entrance side, and it is returned to the outside via valves V7, V8 provided to a pipe on the exit side after cooling within the condenser 103 is disposed. Opening and closing of the valve V7 is controlled according to a result detected by a pressure sensor P2 connected to the discharge side of the condenser 103 in the ON state of a pressure switch PSW to control the flow rate of the cooling water flowing within the piping. It should be noted that a valve V6 provided on the intake side of the valve V7 is a valve for discharge. Note that the cooling function on the condenser 103 by the cooling apparatus 300 that is explained here may have a configuration to perform cooling by means of cold wind by using a cool fan.

The refrigerant cycle 200 serves as a secondary temperature adjusting circuit with a circuit configuration that: shares the evaporator 101 of the freezing cycle 100; collects and stores a refrigerant liquid in the refrigerant tank 201; and heats the refrigerant liquid in a heating apparatus (heater) 202 mounted in the refrigerant tank 201 as appropriate, or does not heat it but returns the refrigerant liquid suctioned, by the pump 203, from the refrigerant tank 201 to the evaporator 101 by interposing the work W.

Also, the heating control apparatus 207 connected to the first printed circuit board (PCB1) 105 controls a heating temperature by the heating apparatus 202 under control on the first printed circuit board (PCB1) 105 according to a temperature difference between a set temperature and a work temperature detected by the first temperature sensor T1.

Furthermore, a flow rate detection sensor 204 is provided in piping on the refrigerant liquid outflow side in the pump 203, and the flow rate of the refrigerant liquid detected by this flow rate detection sensor 204 is input to the first printed circuit board (PCB1) 105, and the first printed circuit board (PCB1) 105 drives the inverter 206 to control the suction amount of the refrigerant liquid in the pump 203. Thereby, the refrigerant liquid is kept at an almost constant amount by logic (LG) in the refrigerant tank 201.

In addition, the valve V1 provided to a pipe on the refrigerant discharge side of the evaporator 101 and the valve V2 provided to a pipe connected to the refrigerant tank 201 are connected to common piping, and communicate with a drain D for discharge processing and used for discharging. Other than this, the valve V3 provided to piping on the refrigerant liquid inflow side of the work W and the valve V4 provided to piping on the outflow side are used mainly for preventing leakage of the refrigerant liquid at a time of piping-connection of the work W to a limited part of the refrigerant cycle 200.

The detailed configuration of the chiller apparatus explained above is common to conventional products. They have in common in that: control in different operation modes is performed according to a temperature difference between an initial set temperature and a work temperature by a control apparatus of the first printed circuit board (PCB1) 105 and the second printed circuit board (PCB2) 106; at a time of high temperature setting with a temperature difference resulting from the set temperature being far higher than the work temperature (for example, the temperature difference is 10° C. or larger), an operation mode of prioritizing a heating function is implemented such that, because a cooling function of the freezing cycle 100 is unnecessary, the rotational speed of the electric compressor 102 is suppressed to be low, and the heating temperature of the heating apparatus 202 of the refrigerant cycle 200 is set to be high so as to remove the temperature difference; and at a time of low temperature setting with a temperature difference resulting from the set temperature being far lower than the work temperature (for example, the temperature difference is 10° C. or larger), an operation mode of prioritizing a cooling function is implemented such that, because a heating function by the heating apparatus 202 of the refrigerant cycle 200 is unnecessary, heating setting of the heating apparatus 202 is not performed, and the rotational speed of the electric compressor 102 of the freezing cycle 100 is set to be high so as to remove the temperature difference.

However, in the present embodiment, there is improvement in a structure and a function of the electric compressor 102 in continuing operation even if it is not need to flow a refrigerant to the evaporator 101 at a time of temperature control setting with a small temperature difference resulting from the set temperature being close to the work temperature (for example, 5° C. to 10° C.), especially in a state where there is little difference between refrigerant temperatures on the refrigerant intake side and refrigerant discharge side of the evaporator 101 in the freezing cycle 100.

Specifically speaking, a first feature in the chiller apparatus according to the present embodiment is that: it has the second temperature sensor T that is provided on a near side of the refrigerant inflow to the heating apparatus 202 on the refrigerant discharge side of the evaporator 101 in the refrigerant cycle 200, and detects a refrigerant temperature; at a time of temperature control setting with a small temperature difference between the set temperature and the work temperature (for example, 5° C. to 10° C.), the second printed circuit board (PCB2) 106 performs a PID operation including proportion, integration and differential calculus about a refrigerant cycle side refrigerant detection temperature detected by the second temperature sensor T2; the first printed circuit board (PCB1) 105 performs serial communication of a drive control signal for an inverter 107 for driving the electric compressor 102, the control signal being generated based on a result of the PID operation; and the first printed circuit board (PCB1) 105 controls the compressor rotational speed in the electric compressor 102 according to the work temperature within a certain range. Note that the second temperature sensor T2 here is also required to have high temperature detection accuracy, a Pt sensor that uses a platinum resistance band that can change the resistance value from 100 ohms to 0 ohm is preferably used.

According to this functional configuration, even when the temperature difference between a set temperature and a work temperature is small and there is little temperature difference between the refrigerant intake side and the refrigerant discharge side of the evaporator 101 in the freezing cycle 100, a function of performing operation without placing an excessive load on the electric compressor 102, maintaining the amount of a refrigerant to flow to the evaporator 101 appropriately, and performing temperature control operation stably can be attained.

Also, a second feature in the present embodiment is that: it has a first electronic expansion valve EV1 that is interposed and connected on the refrigerant intake side of the evaporator 101 in the freezing cycle 100 and driven by a first stepping motor SM1; the second printed circuit board (PCB2) 106 performs a PID operation including proportion, integration and differential calculus about the work temperature detected in the first temperature sensor T1; and the first printed circuit board (PCB1) 105 controls opening and closing of the first electronic expansion valve EV1 by driving the first stepping motor SM1 according to a pulse signal generated based on a result of the PID operation, and controls the flow rate of a refrigerant.

According to this functional configuration, because in addition to the above-mentioned rotational speed control on the electric compressor 102, the amount of a refrigerant separately taken into the evaporator 101 in the freezing cycle 100 can be controlled properly separately, a function of performing temperature control operation further stably can be attained. Note that, in the second printed circuit board (PCB2) 106, preferably, a thermal load amount on the work W side is calculated based on a difference value of refrigerant temperatures detected by the first temperature sensor T1 and the above-mentioned fourth temperature sensor T4 (that is provided on the refrigerant intake side of the evaporator 101 in the refrigerant cycle 200 and the refrigerant outflow side to the work W and detects a refrigerant temperature), and feed-forward control (feed-forward control on a heat input) for improving responsiveness of the opening degree control in the first electronic expansion valve EV1 is performed after correcting a result of the PID operation based on a refrigerant temperature detected by the second temperature sensor T2 by using a calculation result of the thermal load amount. By adding this functional configuration, control on the flow rate of a refrigerant according to the thermal load amount on the work W side in the freezing cycle 100 can be performed accurately.

Furthermore, a third feature in the present embodiment is that: it has a third temperature sensor T3 that is provided on the refrigerant intake side of the electric compressor 102 and on the refrigerant discharge side of the evaporator 101 and is for detecting a refrigerant temperature in the refrigerant cycle 100, and a first bypass passage 108 for a refrigerant to bypass that connects between a part located on the refrigerant intake side of the evaporator 101 and the side of the first electronic expansion valve EV1 that is closer to the condenser 103 provided to the freezing cycle 100, and the refrigerant discharge side, and in which a second electronic expansion valve EV2 to be driven by a second stepping motor SM2 is interposed and connected; the second printed circuit board (PCB2) 106 performs a PID operation including proportional, integration and differential calculus about a freezing cycle side refrigerant temperature detected in the third temperature sensor T3; and the first printed circuit board (PCB1) 105 controls opening and closing of the second electronic expansion valve EV2 by driving the second stepping motor SM2 according to a pulse signal generated based on a result of the PID operation, and controls the flow rate of a refrigerant in the first bypass passage 108. Note that, also in a case of the third temperature sensor T3, because it is not required to have as high detection accuracy as the second temperature sensor T2, a thermocouple sensor that uses a general thermocouple is preferably used in consideration of manufacturing cost.

According to this functional configuration, because in addition to the above-mentioned control on the rotational speed of the electric compressor 102 and control on the amount of a refrigerant taken into the evaporator 101, the bypass flow rate of a refrigerant by means of the first bypass passage 108 in the freezing cycle 100 can be controlled separately, the inflow rate of a refrigerant into the evaporator 101 can be controlled further finely, and a temperature control operation function can be significantly improved.

In addition, a fourth feature in the present embodiment is that: it has a pressure sensor P1 that is provided on the refrigerant intake side of the electric compressor 102 in the freezing cycle 100 and detects a refrigerant pressure, and a second bypass passage 109 for a refrigerant to bypass that connects a part located on the side of the first electronic expansion valve EV1 that is closer to the refrigerant intake side of the evaporator 101, and the refrigerant discharge side of the electric compressor 102, and in which a third electronic expansion valve EV3 to be driven by a third stepping motor SM3 is interposed and connected; the second printed circuit board (PCB2) 106 performs a PID operation including proportional, integration and differential calculus about the refrigerant pressure detected in the pressure sensor P1; and the first printed circuit board (PCB1) 105 controls opening and closing of the third electronic expansion valve EV3 by driving the third stepping motor SM3 according to a pulse signal generated based on a result of the PID operation, and controls the flow rate of a refrigerant in the second bypass passage 109.

Because according to this functional configuration, in addition to the above-mentioned control on the rotational speed of the electric compressor 102, control on the amount of a refrigerant taken into the evaporator 101, and control on the bypass flow rate of a refrigerant by means of the first bypass passage 108, the bypass flow rate of a refrigerant by means of the second bypass passage 109 can be further controlled separately in the freezing cycle 100, the inflow rate of a refrigerant into the evaporator 101 can be controlled very finely, and the temperature control operation function becomes very favorable. Note that the second bypass passage 109 is for preventing a refrigerant from being taken into the electric compressor 102 in a liquid state without being completely vaporized when a cooling load is small, and plays a role as a hot gas bypass circuit that lowers the cooling amount by causing a refrigerant gas in a high-temperature and high-pressure state (hot gas) to bypass therethrough. Other than this, when the second bypass passage 109 for a refrigerant to bypass is provided as in the freezing cycle 100 here, the second printed circuit board (PCB2) 106 controls opening and closing of the third electronic expansion valve EV3 by driving the third stepping motor SM3 according to a pulse signal generated based on a result of a PID operation including proportional, integration and differential calculus about a refrigerant temperature detected in the above-mentioned third temperature sensor T3 (that is provided on the refrigerant intake side of the electric compressor 102 in the freezing cycle 100 and on the refrigerant discharge side to the evaporator 103 and detects a refrigerant temperature), performs serial communication of a drive control signal for an inverter that is generated for maintaining an opening degree of the third electronic expansion valve EV3 at a predetermined amount and is for driving the electric compressor 102, and controls the compressor rotational speed in the electric compressor 102 according to the work temperature within a certain range. Because by adding this functional configuration, control on the compressor rotational speed of the electric compressor 102 according to a thermal load of the freezing cycle 100 can be implemented accurately, control on the flow rate of a refrigerant in the freezing cycle 100 can be performed further reliably.

By the way, about the fourth feature, in the PID operation by the second printed circuit board (PCB2) 106, it may be caused to calculate a refrigerant saturation temperature on the freezing cycle 100 side corresponding to the refrigerant pressure detected in the pressure sensor P1 by replacing with an approximation curve, lower the calculated refrigerant temperature on the freezing cycle 100 side by a predetermined temperature range (for example, −4° C. to −50° C.) from the set temperature with a setting change by a user so as to perform automatic temperature setting control on the initial set temperature, and control the flow rate of a refrigerant in the second bypass passage 109 by performing opening and closing control on the third electronic expansion valve EV3 as the automatic temperature setting control. Note that the approximation curve of a refrigerant saturation temperature corresponding to the refrigerant pressure here can be pre-stored as converted values in a table format in a ROM or the like provided to the second printed circuit board (PCB2) 106, and can be read out by a CPU or the like.

According to this functional configuration, at a time of temperature control setting with a small temperature difference resulting from the set temperature being close to the work temperature (for example, 5° C. to 10° C.), the automatic temperature setting control according to a setting change by a user is a separate function from the above-mentioned control on a PID operation result of the compressor rotational speed of the electric compressor 102 by the first printed circuit board (PCB1) 105, control on the flow rate of a refrigerant of a PID operation result in the first bypass passage 108 by opening and closing control on the second electronic expansion valve EV2, and control on the flow rate of a refrigerant of PID operation result in the second bypass passage 109 by opening and closing control on the third electronic expansion valve EV3, but it is possible to perform the control by combining them. In such a case, especially because the refrigerant can be caused to flow to the refrigerant intake side of the evaporator 101 efficiently by performing opening and closing control on the third electronic expansion valve EV3 via the second bypass passage 109 from the high-pressure discharge side of the electric compressor 102, the freezing function of the freezing cycle 100 can be improved independently when an event that requires rapid cooling of the work W has occurred; as a result, the work W can be cooled efficiently as a function directed to a user unlike conventional techniques.

As regards the detailed configuration of the chiller apparatus according to the embodiment explained above, the cooling apparatus 300, the refrigerant cycle 200 and any of the control apparatuses can be modified in various manners, and for example, the first printed circuit board (PCB1) 105 and the second printed circuit board (PCB2) 106 that constitute the control apparatuses may be configured by a single printed circuit board (PCB) or may have a configuration in which their functions are separated onto three or more boards, so the chiller apparatus of the present invention is not limited to the one that is disclosed in the embodiment.

REFERENCE SIGNS LIST

100: freezing cycle
101: evaporator (heat exchanger)
102: electric compressor
103: condenser
104: expansion valve
105: first printed circuit board (PCB1)
106: second printed circuit board (PCB2)
107, 206: inverter
108: first bypass passage
109: second bypass passage
200: refrigerant cycle
201: refrigerant tank
202: heating apparatus (heater)
203: pump
204: flow rate detection sensor
207: heating control apparatus
300: cooling apparatus
D: drain
EV1: first electronic expansion valve
EV2: second electronic expansion valve
EV3: third electronic expansion valve
P1, P2: pressure sensor
PSW: pressure switch
SM1: first stepping motor
SM2: second stepping motor
SM3: third stepping motor
T1: first temperature sensor
T2: second temperature sensor
T3: third temperature sensor
T4: fourth temperature sensor
V1 to V8: valve
W: work

The invention claimed is:
1. A chiller apparatus comprising:
a freezing cycle configured to cool;
a refrigerant cycle configured to heat and that shares an evaporator provided to the freezing cycle; and
a control apparatus that is interposed and connected within the refrigerant cycle, the control apparatus configured to provide selective temperature setting within a predetermined temperature range for use by a user while using various apparatuses to be temperature control targets as a temperature controlled device, the control apparatus configured to control a rotational speed of an electric compressor provided to the freezing cycle and a heating temperature in a heating apparatus for heating of a refrigerant provided to the refrigerant cycle according to a temperature difference between a set temperature set by the user and a temperature controlled device temperature detected by a first temperature sensor configured to detect a temperature of refrigerant flowing to the temperature controlled device,
wherein at a time of temperature control setting with a small temperature difference between the set tempera- ture and the temperature controlled device temperature, the refrigerant cycle has a second temperature sensor that is provided on a near side of refrigerant inflow to the heating apparatus on the refrigerant discharge side of the evaporator, and is configured to detect a refrigerant temperature, and at a time of temperature control setting with the small temperature difference between the set temperature and the temperature controlled device temperature, the control apparatus (i) performs serial communication of a drive control signal for an inverter configured to drive the electric compressor, the control signal being generated based on a result of a PID operation including proportion, integration and differential calculus about a refrigerant cycle side refrigerant detection temperature detected by the second temperature sensor, and (ii) controls the compressor rotational speed in the electric compressor according to the temperature controlled device temperature within a certain range.

2. The chiller apparatus according to claim 1, wherein the freezing cycle has a first electronic expansion valve that is interposed and connected on a refrigerant intake side of the evaporator and driven by a first stepping motor, and the control apparatus (i) controls opening and closing of the first electronic expansion valve by driving the first stepping motor according to a pulse signal generated based on a result of a PID operation including proportion, integration and differential calculus about the temperature controlled device temperature detected in the first temperature sensor, and (ii) controls the flow rate of a refrigerant.

3. The chiller apparatus according to claim 2, wherein the refrigerant cycle has a third temperature sensor that is provided on a refrigerant intake side of the evaporator and a refrigerant outflow side to the temperature controlled device and is configured to detect a refrigerant temperature, and the control apparatus (i) calculates a thermal load amount on the temperature controlled device side based on a difference value of refrigerant temperatures detected by the first temperature sensor and the third temperature sensor, and (ii) performs feed-forward control for improving responsiveness of opening degree control in the first electronic expansion valve after correcting a result of the PID operation based on a refrigerant temperature detected by the second temperature sensor by using a calculation result of the thermal load amount.

4. The chiller apparatus according to claim 3, wherein the freezing cycle has a fourth temperature sensor that is provided on a refrigerant intake side of the electric compressor and on the refrigerant discharge side of the evaporator and is configured to detect a refrigerant temperature, and a first bypass passage configured to bypass refrigerant from upstream of the first expansion valve and the evaporator to the downstream side of the evaporator in the freezing cycle, and the refrigerant discharge side, and in which a second electronic expansion valve to be driven by a second stepping motor is interposed and connected, and the control apparatus (i) controls opening and closing of the second electronic expansion valve by driving the second stepping motor according to a pulse signal generated based on a result of a PID operation including proportional, integration and differential calculus about a freezing cycle side refrigerant temperature detected in the fourth temperature sensor, and (ii) controls the flow rate of a refrigerant in the first bypass passage.

5. The chiller apparatus according to claim 4, wherein the freezing cycle has a pressure sensor that is provided on a refrigerant intake side of the electric compressor and is configured to detect a refrigerant pressure, and a second bypass passage configured to bypass refrigerant between an upstream side of the evaporator and the downstream side of the electric compressor in the freezing cycle, and in which a third electronic expansion valve to be driven by a third stepping motor is interposed and connected, and the control apparatus (i) controls opening and closing of the third electronic expansion valve by driving the third stepping motor according to a pulse signal generated based on a result of a PID operation including proportional, integration and differential calculus about the refrigerant pressure detected in the pressure sensor, and (ii) controls the flow rate of a refrigerant in the second bypass passage.

6. The chiller apparatus according to claim 4, wherein the freezing cycle has a second bypass passage configured to bypass refrigerant between an upstream side of the evaporator and the downstream side of the electric compressor in the freezing cycle, and in which a third electronic expansion valve to be driven by a third stepping motor is interposed and connected, and the control apparatus (i) controls opening and closing of the third electronic expansion valve by driving the third stepping motor according to a pulse signal generated based on a result of a PID operation including proportional, integration and differential calculus about a refrigerant temperature detected in the third temperature sensor, (ii) performs serial communication of a drive control signal for an inverter that is generated for maintaining an opening degree of the third electronic expansion valve at a predetermined amount and is for driving the electric compressor, and (iii) controls the compressor rotational speed in the electric compressor according to the temperature controlled device temperature within a certain range.

7. The chiller apparatus according to claim 4, wherein the first temperature sensor and the second temperature sensor are Pt sensors including platinum resistance bands, and the third temperature sensor and the fourth temperature sensor are thermocouple sensors including thermocouples.

* * * * *